United States Patent
Choudhury et al.

(10) Patent No.: US 9,734,566 B2
(45) Date of Patent: *Aug. 15, 2017

(54) IMAGE ENHANCEMENT USING SEMANTIC COMPONENTS

(71) Applicant: Sharp Laboratories of America, Inc., Camas, WA (US)

(72) Inventors: Anustup Kumar Choudhury, Vancouver, WA (US); Christopher A. Segall, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,917

(22) Filed: Sep. 29, 2016

(65) Prior Publication Data

US 2017/0018063 A1    Jan. 19, 2017

Related U.S. Application Data

(63) Continuation of application No. 14/956,986, filed on Dec. 2, 2015, now Pat. No. 9,460,490, which is a
(Continued)

(51) Int. Cl.
| | |
|---|---|
| *G06K 9/32* | (2006.01) |
| *G06T 5/50* | (2006.01) |
| *G06T 5/00* | (2006.01) |
| *G06K 9/48* | (2006.01) |
| *G06T 3/40* | (2006.01) |
| *G06K 9/46* | (2006.01) |

(Continued)

(52) U.S. Cl.
CPC .............. *G06T 5/50* (2013.01); *G06K 9/46* (2013.01); *G06K 9/48* (2013.01); *G06T 3/40* (2013.01); *G06T 3/4053* (2013.01); *G06T 5/00* (2013.01); *G06T 7/12* (2017.01); *G06K 9/6217* (2013.01); *G06T 2207/10004* (2013.01)

(58) Field of Classification Search
CPC ....... G06T 5/00; G06T 3/4053; G06T 7/0083; G06T 5/50; G06T 3/40; G06K 9/48; G06K 9/46; G06K 9/6217
USPC ................................................ 382/298–300
See application file for complete search history.

(56) References Cited

U.S. PATENT DOCUMENTS

| | | | | |
|---|---|---|---|---|
| 5,875,268 A | * | 2/1999 | Miyake | G06T 3/403 382/269 |
| 6,173,089 B1 | * | 1/2001 | Van Lerberghe | H04N 19/63 375/E7.056 |

(Continued)

FOREIGN PATENT DOCUMENTS

| | | |
|---|---|---|
| JP | 2004-240622 A | 8/2004 |
| JP | 2010134738 A | 6/2010 |
| JP | 2011171843 A | 9/2011 |

*Primary Examiner* — Kanjibhai Patel
(74) *Attorney, Agent, or Firm* — Chernoff Vilhauer McClung & Stenzel, LLP

(57) ABSTRACT

A system for determining a high resolution output image that includes receiving a low resolution image and determining an intermediate high resolution image. The system detects semantic features based upon the input image and selects corresponding semantic components from a database based upon the detected semantic features. The first intermediate high resolution image is modified based upon information from the corresponding semantic components to determine the high resolution output image.

25 Claims, 2 Drawing Sheets

Related U.S. Application Data continuation of application No. 14/093,425, filed on Nov. 30, 2013, now Pat. No. 9,208,539.

(51) Int. Cl.
*G06T 7/12* (2017.01)
*G06K 9/62* (2006.01)

(56) References Cited

U.S. PATENT DOCUMENTS

| | | | |
|---|---|---|---|
| 6,195,473 B1 * | 2/2001 | Zable | G06T 3/4023 358/447 |
| 6,678,426 B1 * | 1/2004 | Bearss | G06K 15/02 358/1.2 |
| 6,937,774 B1 * | 8/2005 | Specht | G06T 3/4061 348/362 |

* cited by examiner

IMAGE ENHANCEMENT USING SEMANTIC COMPONENTS

CROSS-REFERENCE TO RELATED APPLICATIONS

This application is a continuation of U.S. patent application Ser. No. 14/956,986, filed Dec. 2, 2015, which application is a continuation of U.S. patent application Ser. No. 14/093,425, now U.S. Pat. No. 9,208,539, issued Dec. 8, 2015.

BACKGROUND OF THE INVENTION

The present invention relates to image enhancement using a semantic based technique.

Digital images are typically represented as an array of pixels. Similarly, digital video is typically represented as a series of images or frames, each of which contains an array of pixels. Each pixel includes information, such as intensity and/or color information. In many cases, each pixel is represented as a set of three colors, each of which is defined by eight bit color values.

In many cases, image and/or video encoding and/or transmission systems degrade the quality of the image content in order to reduce the storage requirements and/or the bandwidth requirements for transmission. After encoding and/or transmitting an image and/or video, a restoration technique is used on the image and/or video to attempt to recover the high-quality original image content from the degraded version. The degradation of the image content may occur as a result of numerous reasons, such as for example, image transmission, image coding, limitations of capture or display devices, etc. On the other hand, the enhancement of a degraded image attempts to improve the appearance of the image and/or video.

In other cases, the image content is provided at a first lower resolution, such as a progressive or interlaced scanning (e.g., 720×480 pixels). The image content may be provided in a non-degraded manner or in a degraded manner. The lower resolution image content may be enhanced in some manner to be suitable for displaying on a display having a resolution greater than the lower resolution image content, such as a 4K display (e.g., 3840 by 2160 pixels).

Restoration and/or enhancement of the image and/or video is often a processing step in an image/video display system, especially in large-sized displays. One of the goals may be to restore and enhance the visual appearance of important components of the image and/or video, for example edges, textures and other detail. Another goal is to limit the introduction of undesirable visual artifacts and/or amplification of existing artifacts during restoration and enhancement. A specific example is to limit the introduction or amplification of existing noise in the image and/or video, such as camera noise or compression noise. Another example is to limit introduction of artifacts near edges and contours known as "halo", "undershoot" and "overshoot".

Many different techniques have been used to attempt to perform image (inclusive of video) detail enhancement in order to restore an image. Many such techniques are based upon a hierarchical framework using a Laplacian pyramid to decompose the image into multiple levels, including a smooth low frequency image and other high frequency components. Each level is then enhanced and combined together to form the enhanced image. While decomposing the image, edge preservation techniques may be used to reduce halo effects.

Another technique to perform image detail enhancement involves applying a bilateral filter to get different components of the image under multiple lighting conditions and enhance the details of the image by combining these components. The range of the bilateral filter may be modified to simultaneously perform both detail enhancement and noise removal. Another technique includes acquiring information about oscillations of the image from local extrema at multiple scales and using this information to build a hierarchy which is used to enhance details of the image. Yet another technique involves using wavelets to build a multi-resolution analysis framework to decompose an image into smooth and its detail components, where the wavelets are specifically constructed according to the edge content of the image to reduce halo effects.

Another technique to perform image detail enhancement uses a filter to perform multi-scale decomposition of images. The filter is edge-preserving and the smoothing is based on a Weighted Least Squares (i.e., WLS) optimization framework. This may be mathematically represented as calculating the minimum of, $$\sum_p \left( (u_p - g_p)^2 + \lambda \left( a_{x,p}(g) \left(\frac{\partial u}{\partial x}\right)_p^2 + a_{y,p}(g) \left(\frac{\partial u}{\partial y}\right)_p^2 \right) \right)$$

where g is the input image, u is the output image and subscript p is the spatial location of the pixel. This function tries to maintain u as close as possible to g and achieves smoothness by minimizing the partial derivatives of u. The smoothness weight is determined by $a_x$ and $a_y$, while $\lambda$ controls the amount of smoothing. Greater $\lambda$ implies more smoothing. For example, this technique may be used in a Laplacian pyramid framework to obtain abstraction at different levels.

As previously described there are many different techniques to provide image enhancement together with increased resolution. For example, D. Glasner, S. Bagon, M. Irani, Super-resolution from a single image, ICCV 2009, describe the use of redundancies in the input image to construct a pyramid having low-res/high-res image pairs and uses a learning-based method to perform super-resolution of the input image. For example, J. Sun, J. Sun, Z. Xu, H. Y. Shum, Gradient Profile Prior, CVPR 2008, describe the use of a large database of natural images to learn the distribution of gradient profiles and modifies the gradient information of the input image to fit this distribution in order to obtain sharp edges and consequently perform super-resolution of images. For example, Yang, J. Wright, T. Huand and Y. Ma., Image super-resolution via sparse representation, IEEE TIP 2010, describe the use of a dictionary-based super-resolution method based on ideas in sparse signal processing and show how a joint compact dictionary can be trained to learn the correspondence between high-resolution and low-resolution training image patches. H. He, W. C. Siu., Single image super-resolution using Gaussian Process Regression, CVPR 2010, describe a super-resolution technique using a Gaussian Process Regression model without any training dataset. R. Fattal, Upsampling via imposed edge statistics, SIGGRAPH 2007, describe the use of a super-resolution method based on the relationship between the edge statistics based on local intensity continuity of low-resolution and the high-resolution images. W. Freeman, T. Jones, E. Pasztor, Example-based super-resolution, IEEE Computer Graphics and Applications 2002, describe using a technique to hallucinate high frequency details from a training set of high-resolution and low-resolution image pairs. Y. W. Tai, S. Liu, M. Brown, S. Lin, Super resolution using edge prior and single image detail synthesis, CVPR 2010, describe the use of an extended gradient profile technique using exemplar texture patches to get improved details in the image. J. Sun, J. Zhu, M. Tappen, Context constrained hallucination for image super-resolution, CVPR 2010, describe an image super-resolution technique formulated as an energy minimization framework that enforces different criteria such as fidelity of the high-resolution image to the input image, the fidelity of pixel to discrete candidate examples and the smoothness of edge. This method analyzes textural characteristics of a region surrounding each pixel to search database for segments with similar characteristics. All references described herein are incorporated by reference in their entirety.

Many existing techniques for detail enhancement, such as those mentioned above, are effective in enhancing the image and/or video. However, such techniques may still result in images that are not aesthetically pleasing to the viewer.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

While viewing an image or a video, the focus of a person is different for different regions of the image, depending on the content depicted therein. The salient components of the image content drive people's attention to different regions of the image. For example, when a viewer looks at the image of a tree, there are semantic components such as the leaves or the branches that are important to the viewer. For example, when a viewer looks at the image of a face, there are semantic components such as the eyes, eyebrows, nose, and mouth that are important to the viewer. Existing resolution enhancement techniques tend to either perform interpolation of the different pixels, or use a reconstruction based approach that includes the assumption that the high-resolution images should accurately reproduce the low-resolution images when down-sampled or use a learning-based approach where the high frequency details of the image are reconstructed on a patch-by-patch basis using a training dataset of low-resolution and high-resolution images. However, to enhance the image content in a manner suitable for the viewer, it is desirable to modify the enhanced image based upon the semantic content of the image content in an efficient manner.

Figure 1:
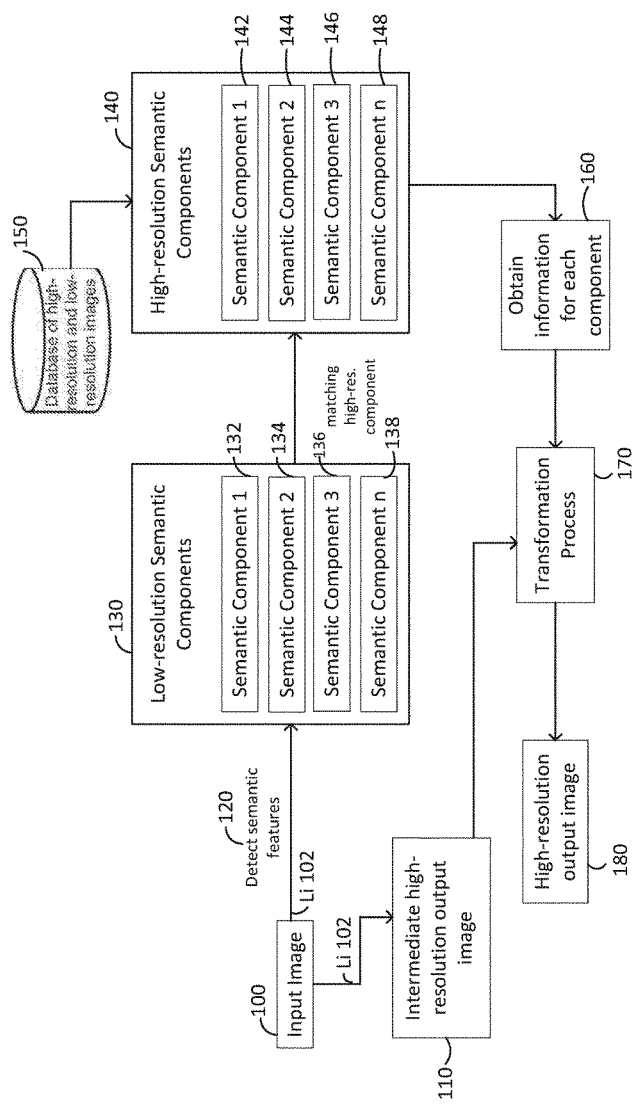
FIG. 1 illustrates an image enhancement system using semantic content.
Figure 2:
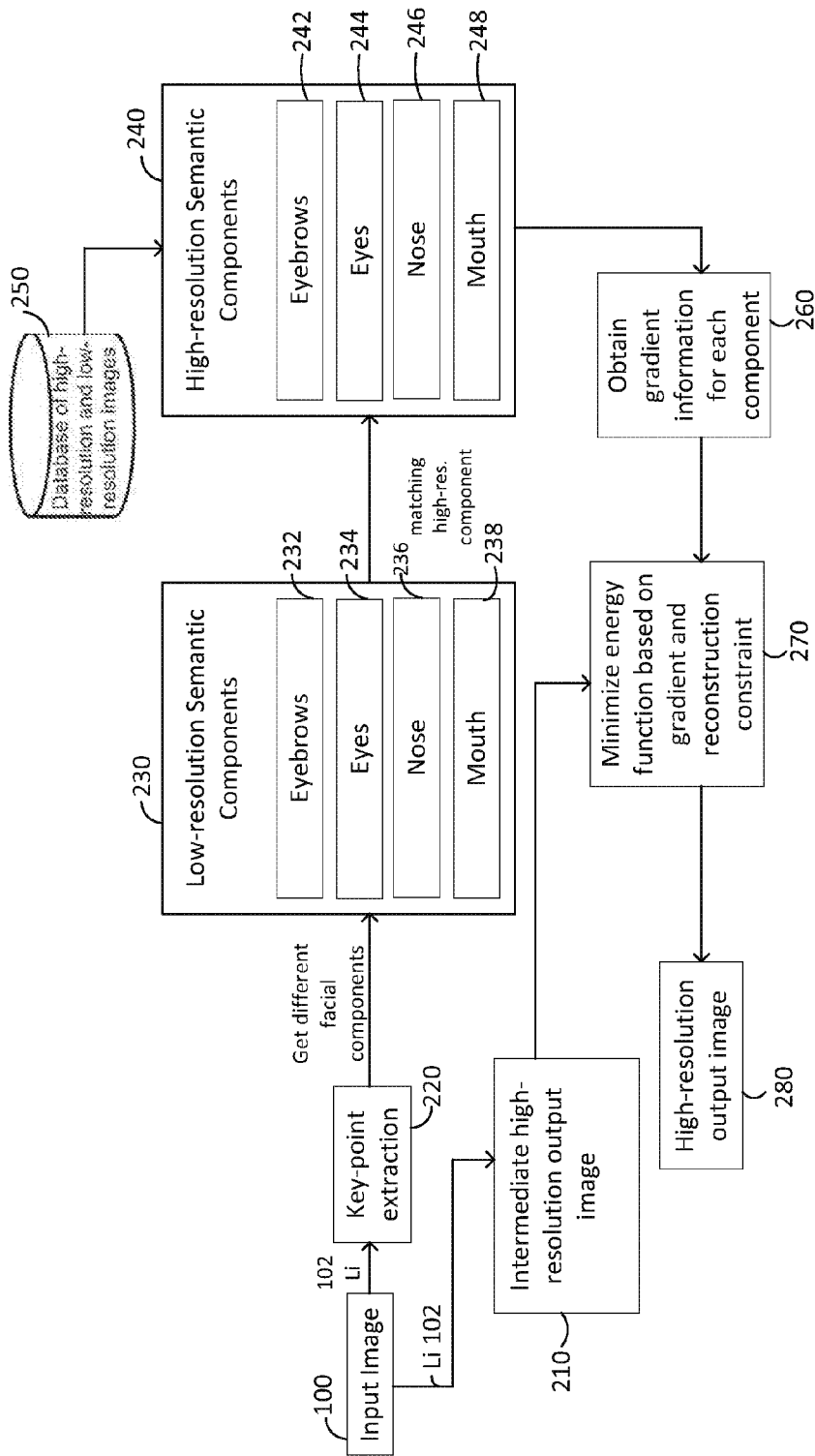
FIG. 2 illustrates an image enhancement system using facial semantic content.

Referring to FIG. 1, the image enhancement technique may receive an input image 100, which is a low resolution image $L_I$ 102. The low resolution image $L_I$ 102 may be used to determine an intermediate high-resolution output image 110 using any suitable technique. The intermediate high resolution output image 110 preferably has a higher resolution than the low resolution image $L_I$ 102. Also, preferably the intermediate high resolution output image 110 has the same number of pixels as the output image. Referring also to FIG. 2, which is an exemplary implementation of FIG. 1, the intermediate high resolution output image 110 is preferably implemented using a dictionary based technique 210, using any suitable technique. Also, preferably the intermediate high resolution output image 210 has the same number of pixels as the output image. The term "high-resolution" is used in general to mean high-quality image and/or video data, for example image data containing high-frequency components, and/or image data containing fine details and textures, and/or image data with sharp edges and contours and/or data with more pixels than the input data. The term "low-resolution" is used in general to mean image and/or video data that may have been degraded during capture, encoding or transmission, and generally contains fewer high-frequency components, and/or fewer detail and/or compression artifacts and/or fewer pixels than output data.

The low resolution image $L_I$ 102 is preferably increased in resolution to a predetermined resolution for subsequent processing. The low resolution image $L_I$ 102, after being increased in resolution, may be used to detect semantic features 120 of the image using any suitable technique. The detected semantic features 120 identify those features of the image that carry semantic information in the image regions which correspond to semantic objects in the image. For example, the features in the image may be a face, a tree, a desk, a cat, a girl, a boy, a waterfall, a ball, etc. Referring also to FIG. 2, which is an exemplary implementation of FIG. 1, the detected semantic features 120 is preferably implemented using a key point extraction technique 220 on the increased resolution image. The key point extraction technique 220 identifies points or regions in the image of the semantic content, using any suitable technique. In the case of the semantic content detection of facial images, the key point extraction may be related to the different facial components.

The detected semantic features 120 may be used to select low-resolution semantic components 130 of the image. There may be one or more semantic components 130 that are selected, such as semantic component 1 132, semantic component 2 134, semantic component 3 136, to semantic component n138. Referring also to FIG. 2, which is an exemplary implementation of FIG. 1, a detection technique to detect low-resolution semantic components 230 is preferably implemented for facial components to select eyebrows 232, eyes 234, a nose, 236 and a mouth 238. The semantic components 230 are preferably point representations, or otherwise, rather than full two dimensional blocks of pixels encompassing the semantic component. This permits enhanced matching to a database.

The information from the low resolution semantics components 130 is provided to the high resolution semantic components 140. The high resolution semantic components 140 may include a high resolution semantic component 1 142, a high resolution semantic component 2 144, a high resolution semantic component 3 146, through a high resolution semantic component n 148. The high resolution semantic components 140 also receive corresponding information from a database of high resolution and low resolution images 150 for each of the semantic components. The database 150 may include a dataset of high resolution images with labeled semantic components corresponding to the semantic components 142, 144, 146, 148 of the high resolution semantic components 140. For each of the components, a preferred match is selected from the database 150 corresponding to the low resolution semantic components 132, 134, 136, 138, each at a predetermined matching resolution to the low resolution images of the database 150. Greater computational efficiency and proper matching is achieved when the low resolution images 150 match the resolution of the low resolution semantic components 130. Also, input image 100 with different resolutions are more readily effectively processed by using the increased resolution process.

Referring also to FIG. 2, which is an exemplary implementation of FIG. 1, the information from the low resolution semantic components 230 are provided to the high resolution semantic components 240. The high resolution semantic components 240 may include eyebrows 242, eyes 244, a nose 246, and a mouth 248. The high resolution semantic components 240 also receive corresponding information from a database of high resolution and low resolution images 250 for each of the facial components. The database 250 may include a database of high resolution images with labeled semantic components from database 250 corresponding to the semantic components 242, 244, 246, 248 of the high resolution semantic components 240. In particular, the database may be based upon semantically labeled facial images, with a separate database (or parts thereof) being constructed for each anticipated pose. In particular, for a face image each labeled semantic component $SC_i$ may be included such as eyes, eyebrows, nose, and mouth where i is the label of semantic component. This deconstruction may be used for other semantic image content and components thereof.

Referring to FIG. 2, for each test image, the system may first determine the pose of the face and then use the database corresponding to that pose of the face. Then, the system may perform 2 up-sampling operations. First, the image may be up-sampled using a naïve bicubic interpolation $I_l$ and then label the different semantic components. Then, the system may up-sample the image $D_l$ using a dictionary based technique. Information about the gradients of the semantic components is transferred to this image in order to obtain the final enhanced image. The system may label the different semantic components in $I_l$.

For each of the semantic components in the test image $C_i$ where i is the label of the semantic component, the system may determine the best matching aligned component from the training database. Before aligning and matching these components, the system may also use information the particular semantic content, such as about people wearing glasses. For people wearing glasses, to align eyes and eyebrows the system may use training examples of eyes, nose and eyebrows only from people wearing glasses. Similarly, for people not wearing glasses the system may use training examples of eyes, nose and eyebrows only from people not wearing glasses. For the other semantic component such as mouth, the system may use the entire database because the glasses do not obstruct the mouth region of the face. For a specific component, let T be the images being considered from the training database.

In order to estimate the aligned component the system may do affine transformation at more than one dimension on $SC_i$ to determine the parameters pertaining to rotation, scaling and translation. This can be determined by solving the following equation for every image in the database $$\forall_i \operatorname*{argmin}_{r, s_x, s_y, t_x, t_y} \|A(SC_i) - C_i\|^2,$$

where i stands for each semantic component label, A is the affine transformation that is performed on the semantic components of the training database, r is the parameters for rotation, s_x is the parameter for scaling in the X-direction, s_y is the parameter for scaling in the Y-direction, t_x is the translational parameter in the X-direction, and t_y is the translational parameter in the Y-direction. Since the system preferably uses the alignment independently for each semantic component label i, the system can effectively consider different expressions and sizes of the components. The system may use these transformation parameters to transform T to obtain AT, Once the system has aligned each component of the training dataset to the corresponding component of the image, the next step may be to find the best matching component from those aligned components. The criterion to find the best matching component is preferably gradient information. The system may down-sample images in AT and then up-scale those images by bicubic interpolation to obtain UT. For every component label i, the system may define a region that is a convex hull of the set of key-points. Let p be the pixels present in the convex hull of the semantic component. The best match $\hat{x}_i$ for each component label i can be determined as follows $$\forall_i \hat{x}_i = \operatorname*{argmin}_{x} \sum_{p \in H(C_i)} \|\nabla I_l(p) - \nabla UT_x(p)\|^2,$$

where $\nabla$ is the gradient operator, H is the convex hull defined by component $C_i$, x are the indices of images UT in UT. This provides a matching matched aligned component for each component of the face image and a different match $\hat{x}_i$ may be retrieved for each component.

The semantic components 140, 240 are preferably two-dimensional images from which useful characteristics may be extracted. Referring again to FIG. 1, the system may obtain information for each component 160 from the selected semantic components 142, 144, 146, 146. For example, this information may be edge based information (e.g., gradient information), color based information, texture information, or other suitable information related to one or more of the semantic components. Referring also to FIG. 2, which is an exemplary implementation of FIG. 1, the system may obtain gradient information for each component 260, each of which is preferably aligned and scaled. In addition, the spatial location of each component 250 is likewise maintained.

This process of obtaining information for each component 150 (FIG. 1), 250 (FIG. 2) may be repeated for all the desired semantic components of the image. The system may also, if desired, merge all the information 160, 260 together in a suitable manner. This merged information is provided to a transformation process 170 which suitably modifies the intermediate high resolution output image 110 to determine a high resolution output image 180, based upon the semantic features. In this manner, the intermediate high resolution output image which would otherwise be the high resolution output image, is further modified in accordance with the semantic content of the input image 100 to obtain the refined high resolution output image 180 that is more suitable for viewing.

Referring to FIG. 2, which is an exemplary implementation of FIG. 1, the gradient information 260 may be merged together to obtain a transformed gradient map $\nabla I_h^T$. This gradient map is then transferred to the corresponding component of $D_l$ using the equation $E(I_h|L_l, \nabla I_h^T) = E_i(I_h|L_l) + \alpha E_g(\nabla I_h|\nabla I_h^T)$, where v is the gradient operator, $E_i(I_h|L_l)$ is the reconstruction constraint in the image domain, $E_g(\nabla I_h | I_h^T)$ is the reconstruction constraint in the gradient domain and $\alpha$ balances the image domain constraint and the gradient domain constraint. $L_l$ is the low resolution image and the high-resolution image $I_h$ is constructed by minimizing the energy function that enforces constraints in both gradient domain and the image domain. The energy may be minimized by a gradient descent technique $$I_h^{t+1} = I_h^t - \tau \cdot \frac{\partial E(I_h)}{\partial I_h},$$

where $\frac{\partial E(I_h)}{\partial I_h} = ((I_h * G)\downarrow - D_l)\uparrow * G - \alpha \cdot (\nabla^2 I_h - \nabla^2 I_h^T)$.

This is an iterative process and the system may use $D_l$ as an initialization step for $I_h$ and $\tau$ is the step size. The final enhanced image $I_h$ comprises of the enhanced semantic components.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An image enhancement system for determining a high resolution output image comprising:
    (a) receiving unit for receiving a low resolution image having a first resolution;
    (b) determining unit for determining a first intermediate high resolution image having a second resolution based upon said low resolution image, where the second resolution is greater than the first resolution;
    (c) determining unit for determining a second intermediate high resolution image having a third resolution based upon said low resolution image, where said third resolution is greater than said first resolution;
    (d) detecting unit for detecting semantic features of said second intermediate high resolution image and selecting corresponding semantic components from a database based upon said detected semantic features;
    (e) modifying unit for modifying said first intermediate high resolution image based upon information from said corresponding semantic components to determine said high resolution output image having a fourth resolution, where the fourth resolution is greater than the first resolution.

2. The image enhancement system of claim 1 wherein said second resolution is the same as said fourth resolution, and said second resolution and said fourth resolution are different than said third resolution.

3. The image enhancement system of claim 1 wherein determining said first intermediate high resolution image is based upon a dictionary technique.

4. The image enhancement system of claim 1 wherein detecting semantic features is based upon a key point extraction technique.

5. The image enhancement system of claim 1 wherein detected semantic features is used to select first semantic components.

6. The image enhancement system of claim 5 where said corresponding semantic components is based upon said first semantic components.

7. The image enhancement system of claim 6 wherein said first semantic components have a first semantic resolution, said corresponding semantic components have a second semantic resolution, where said second semantic resolution is greater than said first semantic resolution.

8. The image enhancement system of claim 7 wherein said database includes information representative of said first semantic components and said corresponding semantic components.

9. The image enhancement system of claim 8 wherein said database includes information related to different variants of the same semantic content.

10. The image enhancement system of claim 7 wherein a multi-dimensional scaling operation is used to determine said corresponding semantic components.

11. The image enhancement system of claim 1 wherein said information from said corresponding semantic components is edge based information.

12. The image enhancement system of claim 11 wherein said information is combined for a plurality of corresponding semantic components.

13. The image enhancement system of claim 1 wherein modifying said first intermediate high resolution image is based upon reducing an error function.

14. An image enhancement system for determining a high resolution output image comprising:
    (a) receiving unit for receiving a low resolution image having a first resolution;
    (b) determining unit for determining a first intermediate high resolution image having a second resolution based upon said low resolution image;
    (c) determining unit for determining a second intermediate high resolution image having a third resolution based upon said low resolution image;
    (d) detecting unit for detecting semantic features of said second intermediate high resolution image and selecting corresponding semantic components from a database based upon said detected semantic features;
    (e) modifying unit for modifying said first intermediate high resolution image based upon information from said corresponding semantic components to determine said high resolution output image having a fourth resolution.

15. The image enhancement system of claim 14 wherein said determining said first intermediate high resolution image is based upon a dictionary technique.

16. The image enhancement system of claim 14 wherein said detecting semantic features is based upon a key point extraction technique.

17. The image enhancement system of claim 14 wherein said detected semantic features is used to select first semantic components.

18. The image enhancement system of claim 17 where said corresponding semantic components is based upon said first semantic components.

19. The image enhancement system of claim 18 wherein said first semantic components have a first semantic resolution, said corresponding semantic components have a second semantic resolution.

20. The image enhancement system of claim 19 wherein said database includes information representative of said first semantic components and said corresponding semantic components.

21. The image enhancement system of claim 20 wherein said database includes information related to different variants of the same semantic content.

22. The image enhancement system of claim 19 wherein a multi-dimensional scaling operation is used to determine said corresponding semantic components.

23. The image enhancement system of claim 14 wherein said information from said corresponding semantic components is edge based information.

24. The image enhancement system of claim 23 wherein said information is combined for a plurality of corresponding semantic components.

25. The image enhancement system of claim 14 wherein modifying said first intermediate high resolution image is based upon reducing an error function.

\* \* \* \* \*

UNITED STATES PATENT AND TRADEMARK OFFICE
CERTIFICATE OF CORRECTION

PATENT NO. : 9,734,566 B2
APPLICATION NO. : 15/279917
DATED : August 15, 2017
INVENTOR(S) : Anustup Kumar Choudhury and Christopher A. Segall Page 1 of 1

It is certified that error appears in the above-identified patent and that said Letters Patent is hereby corrected as shown below:

In the Specification

Column 7, Line 2:
Change "$E_g(\nabla I_h | I_h^T)$," to read --$E_g(\nabla I_h | \nabla I_h^T)$--.

Signed and Sealed this
Fifth Day of December, 2017

Joseph Matal
*Performing the Functions and Duties of the*
*Under Secretary of Commerce for Intellectual Property and*
*Director of the United States Patent and Trademark Office*